Figure 11:
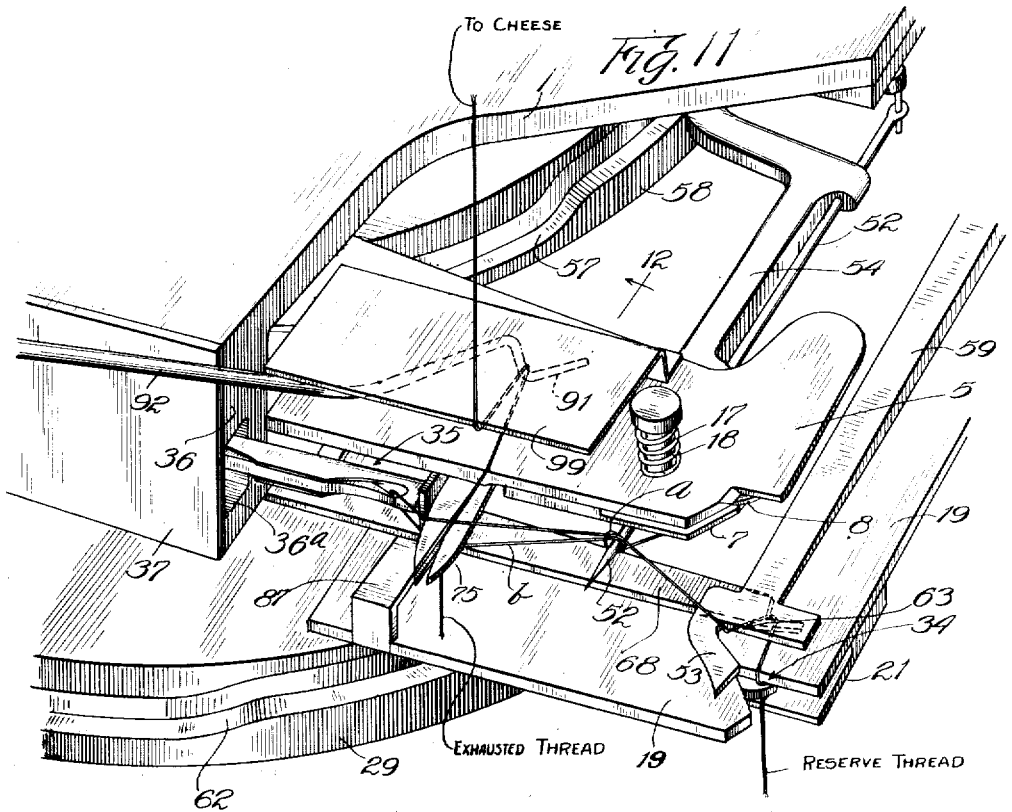

April 3, 1928.
B. A. PETERSON
1,664,571
METHOD OF AND MEANS FOR TYING WEAVERS' KNOTS
Original Filed Nov. 18, 1921   9 Sheets-Sheet 1
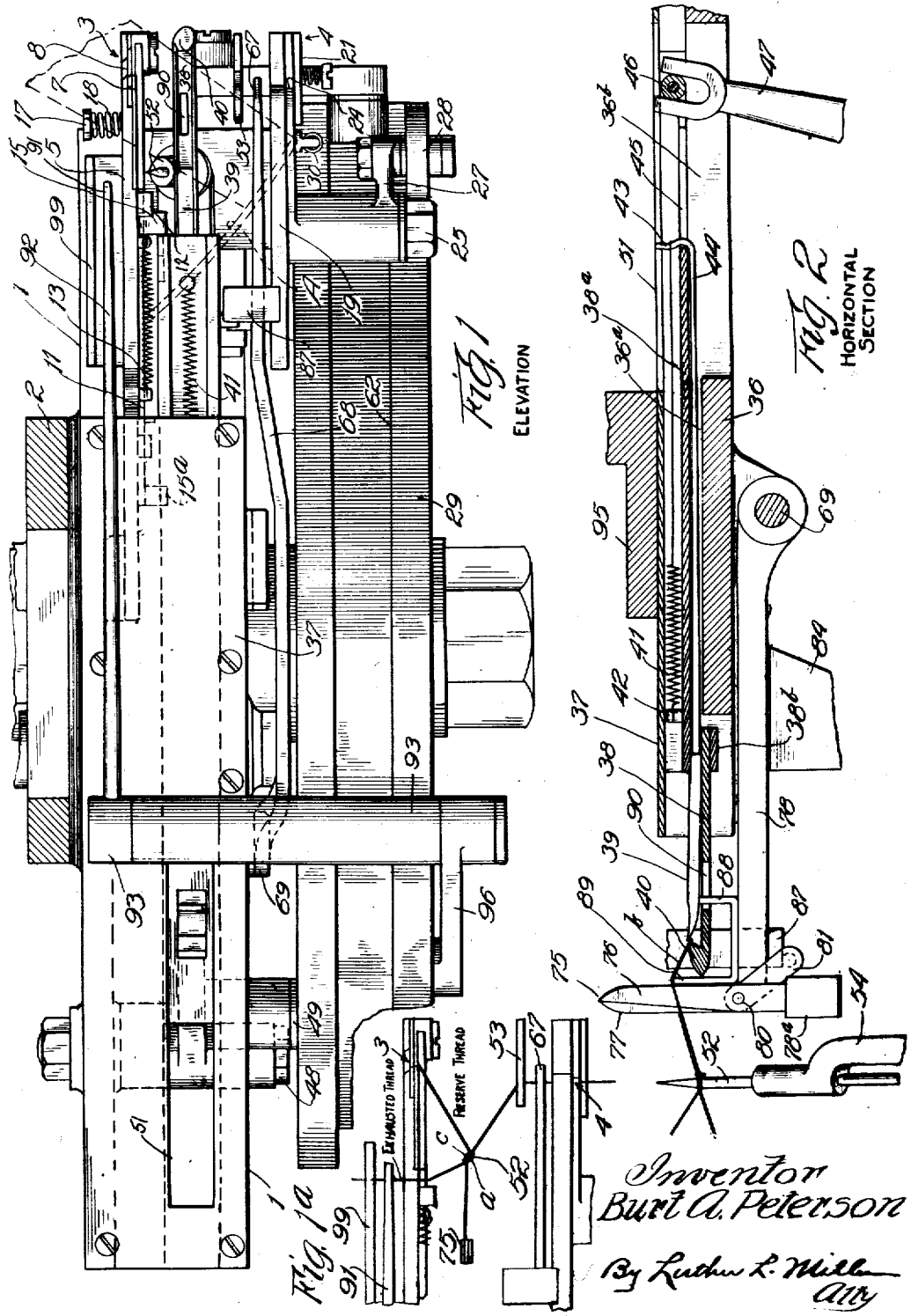

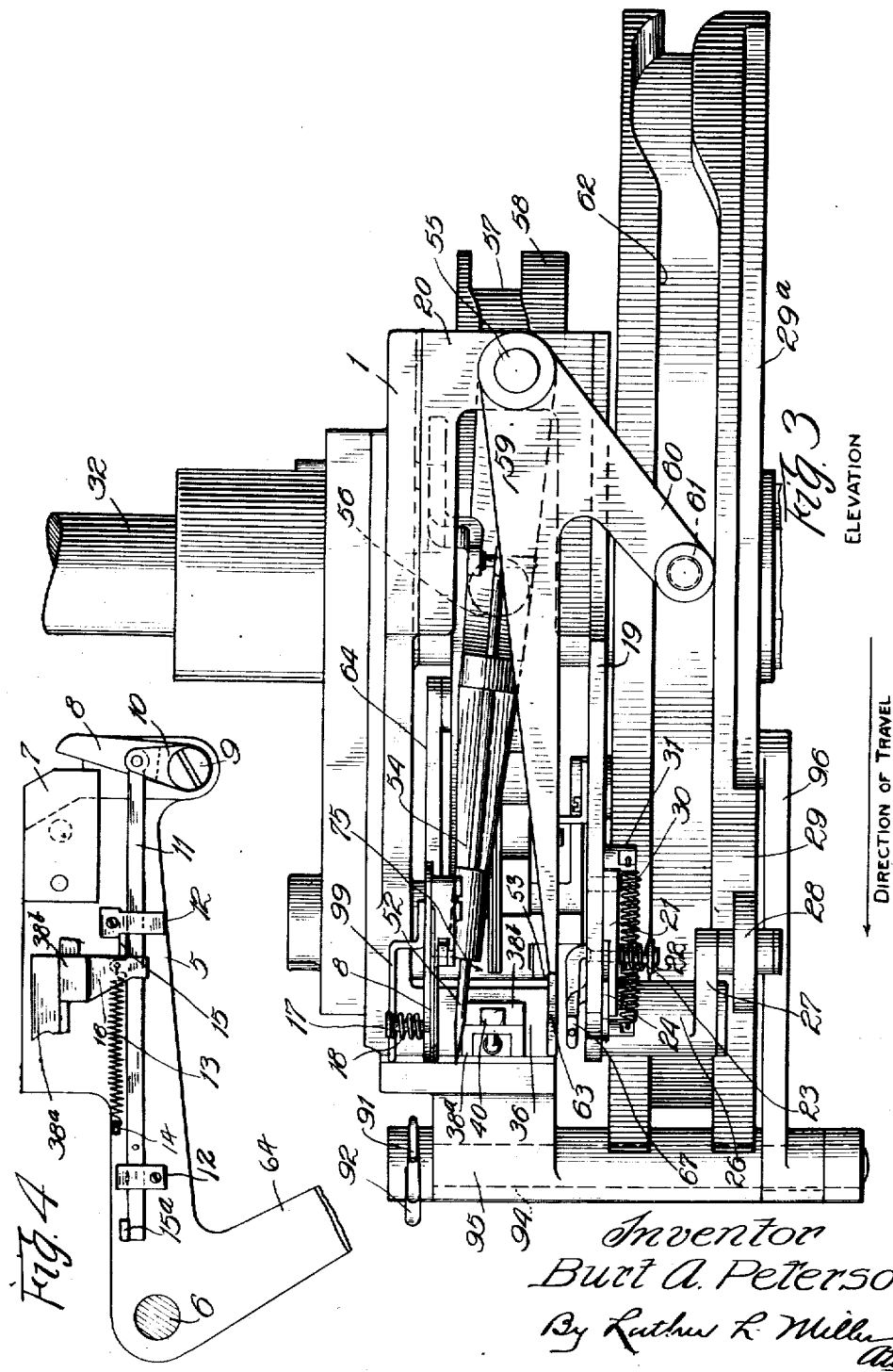

April 3, 1928.
B. A. PETERSON
1,664,571
METHOD OF AND MEANS FOR TYING WEAVERS' KNOTS
Original Filed Nov. 18, 1921    9 Sheets-Sheet 3
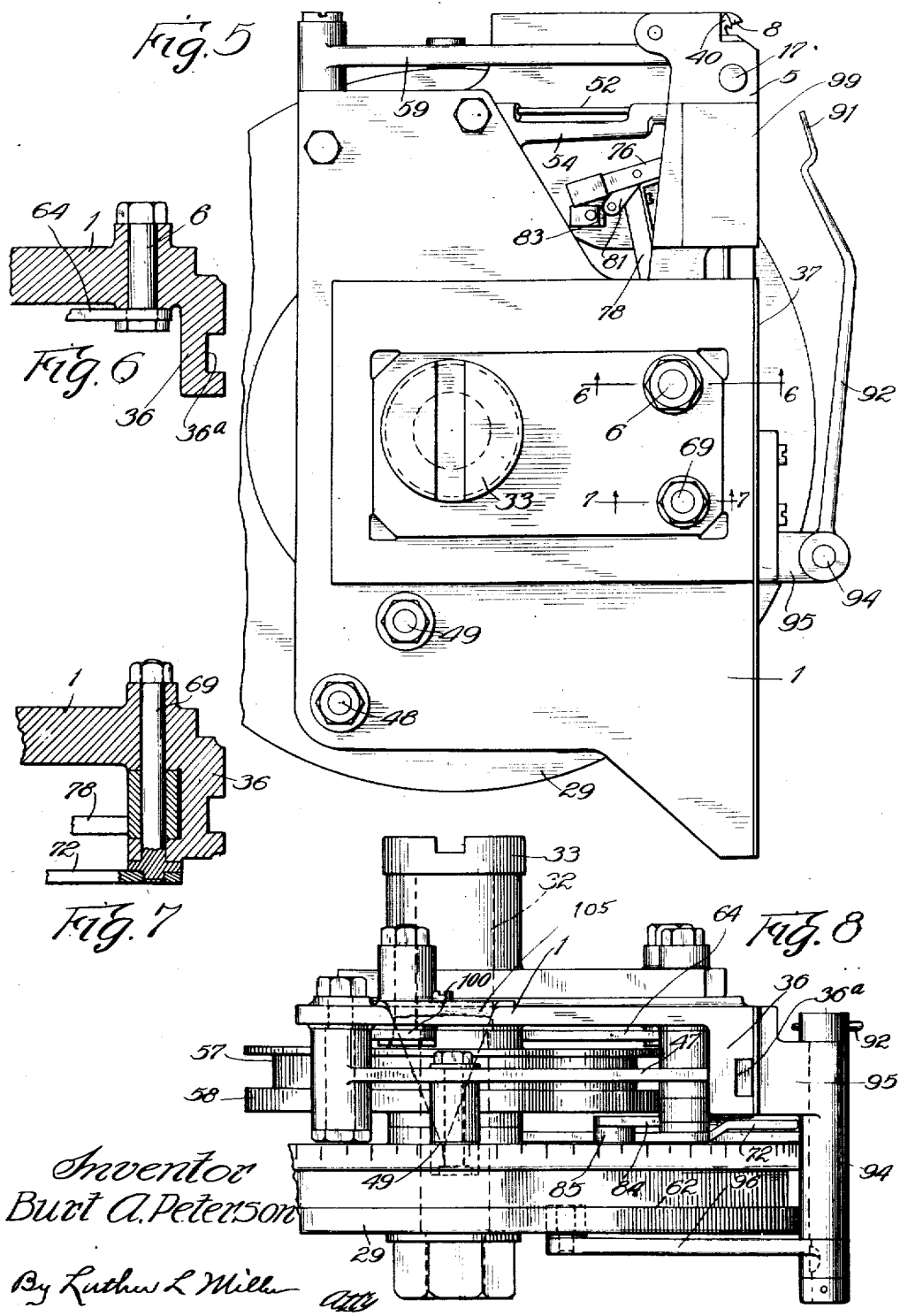
Inventor
Burt A. Peterson
By Luther L. Miller
Atty

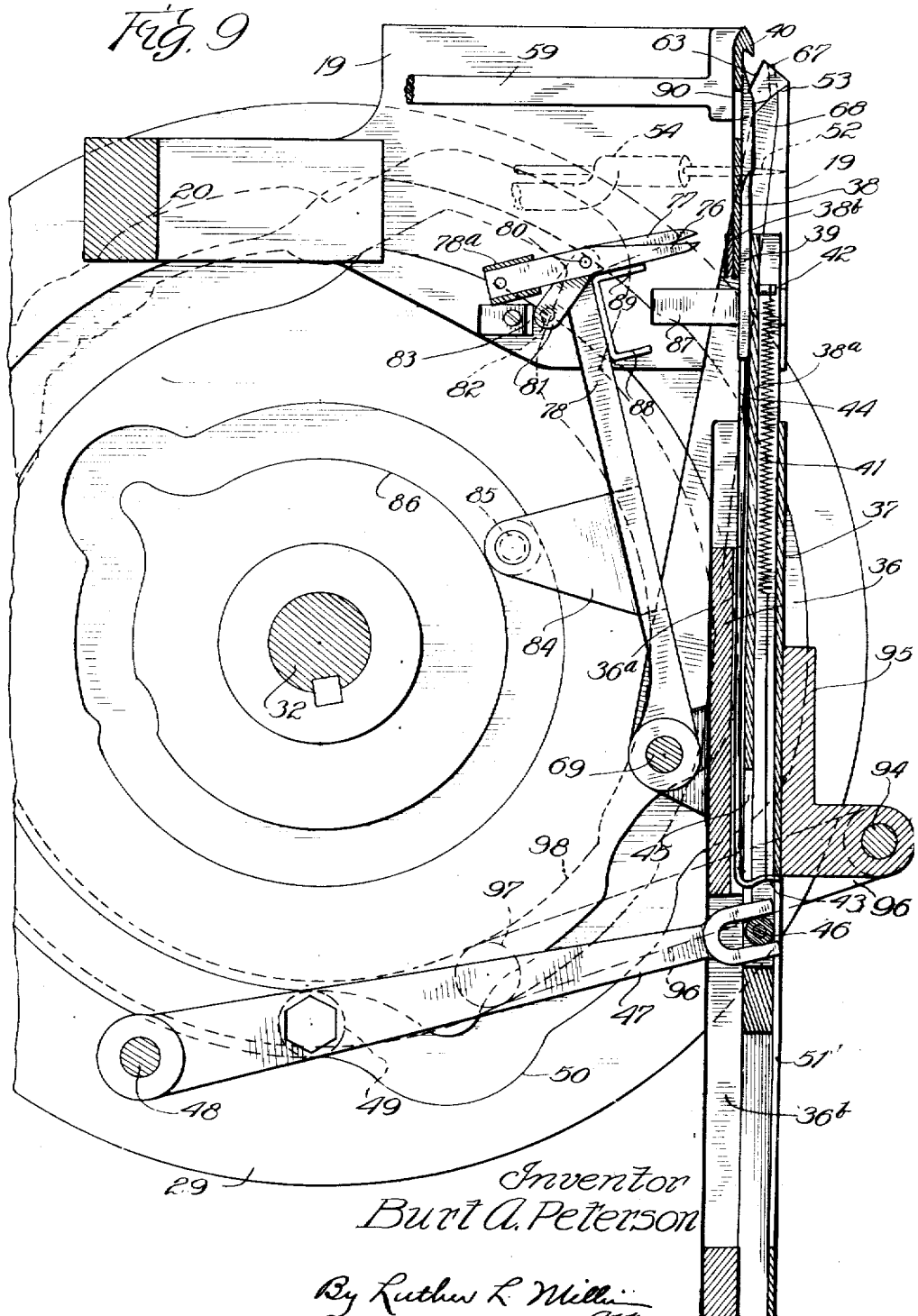

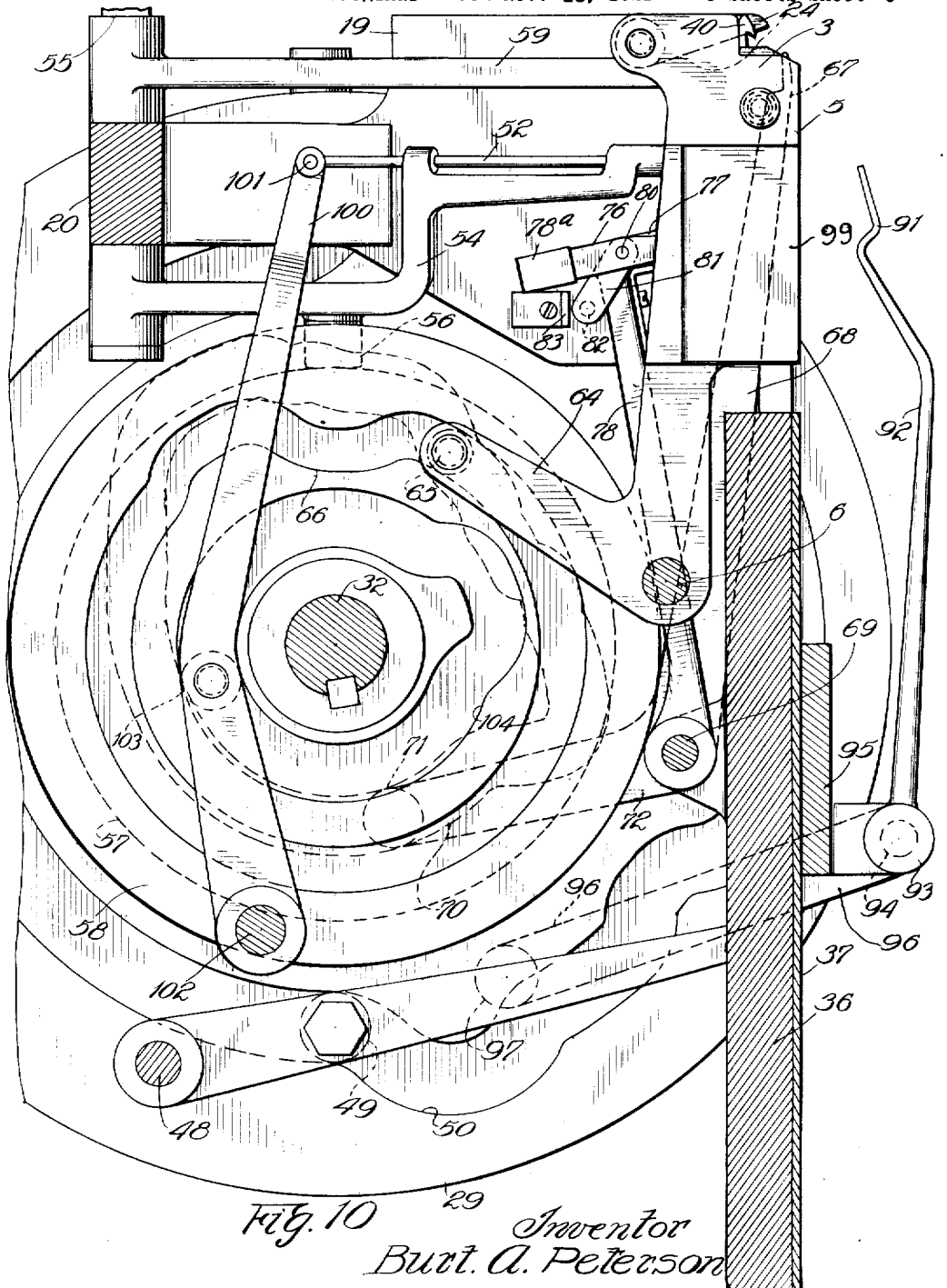

April 3, 1928.

B. A. PETERSON 1,664,571

METHOD OF AND MEANS FOR TYING WEAVERS' KNOTS

Original Filed Nov. 18, 1921    9 Sheets-Sheet 6

Inventor
Burt A. Peterson
By Luther R. Miller Atty

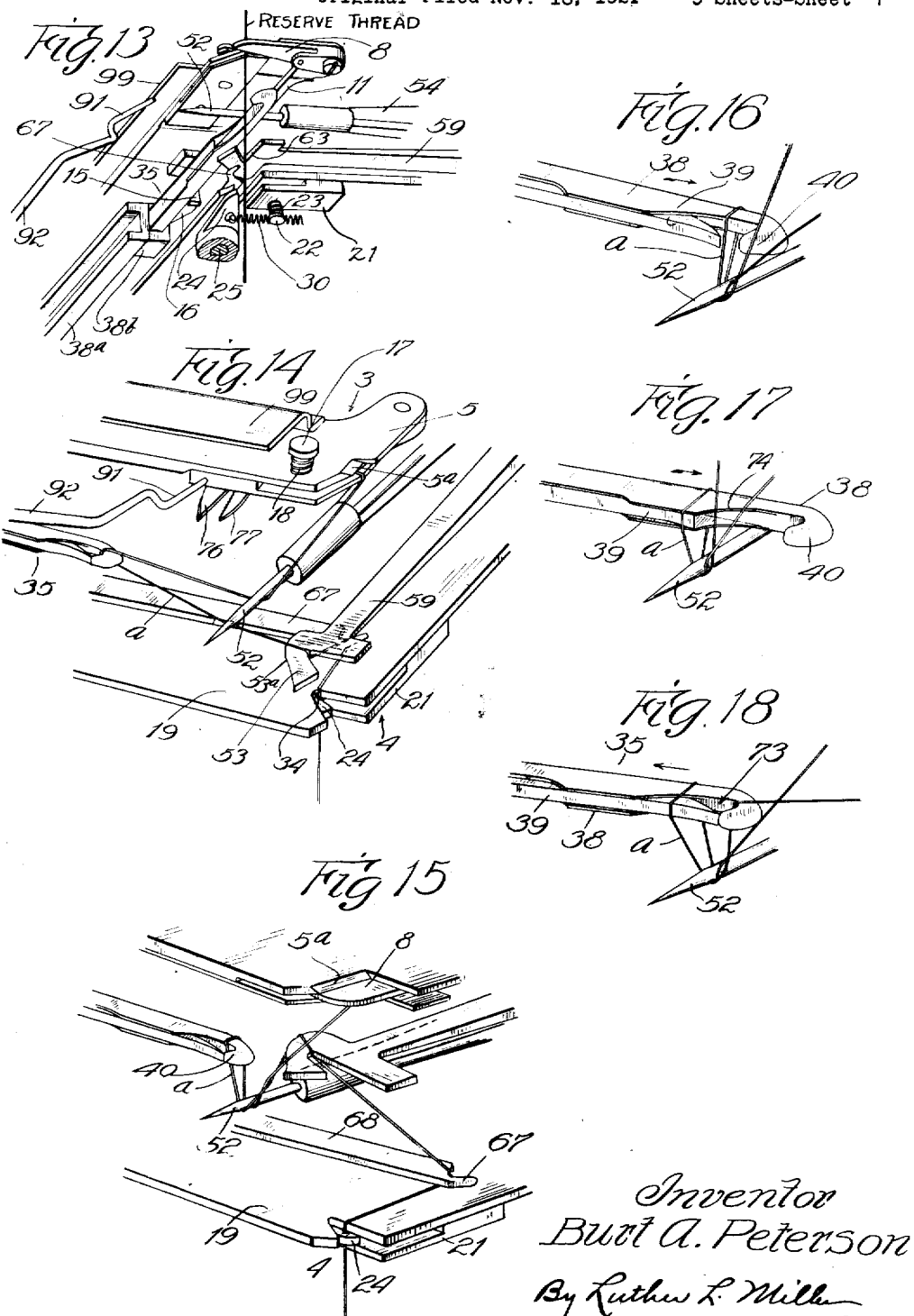

April 3, 1928. 1,664,571
B. A. PETERSON
METHOD OF AND MEANS FOR TYING WEAVERS' KNOTS
Original Filed Nov. 18, 1921 9 Sheets-Sheet 8

Inventor
Burt A. Peterson
By Ruther L. Miller Atty.

April 3, 1928.
B. A. PETERSON
METHOD OF AND MEANS FOR TYING WEAVERS' KNOTS
Original Filed Nov. 18, 1921    9 Sheets-Sheet 9
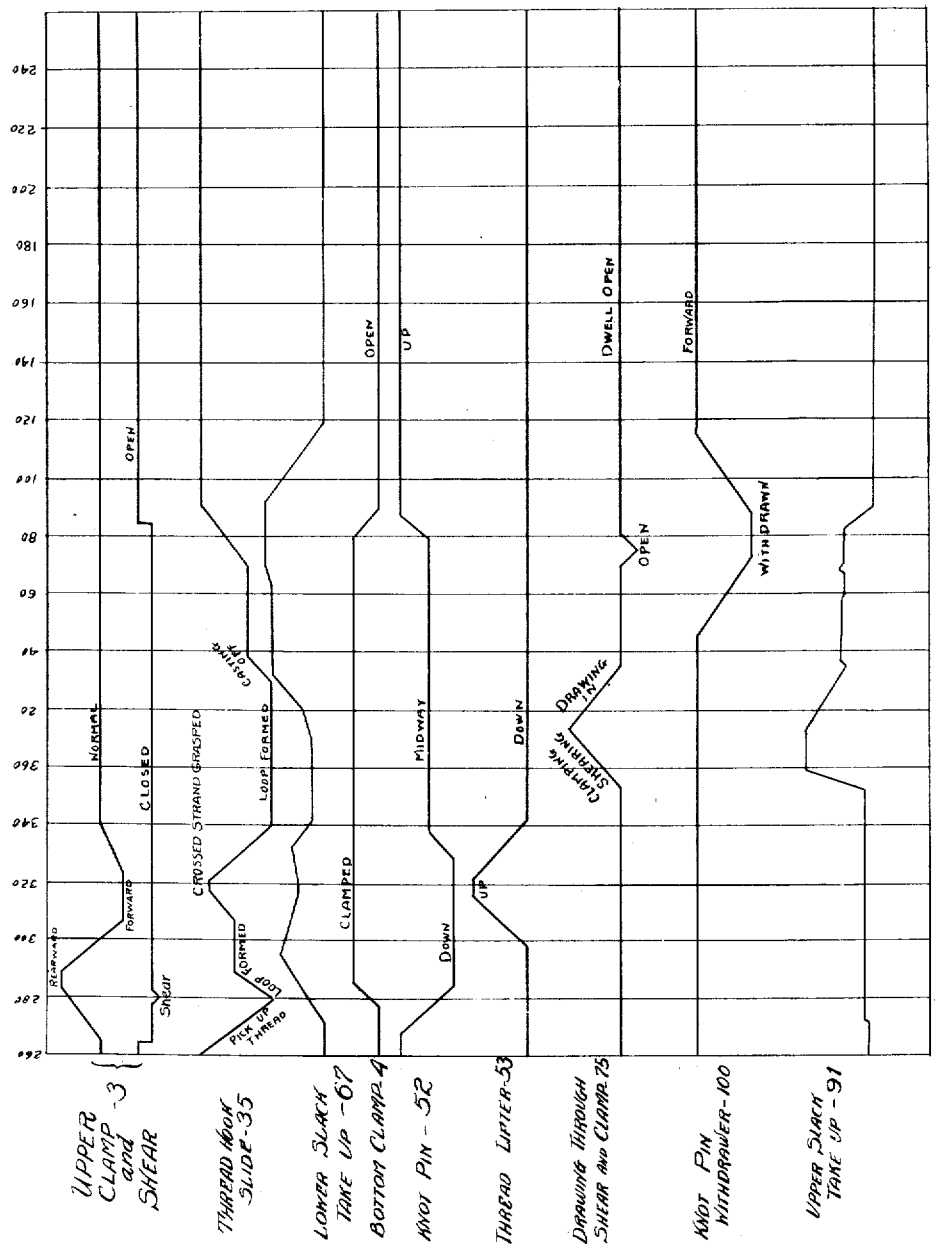
Inventor
Burt A. Peterson
By Luther L. Miller
Atty Patented Apr. 3, 1928.

1,664,571

UNITED STATES PATENT OFFICE.

BURT A. PETERSON, OF ROCKFORD, ILLINOIS, ASSIGNOR TO EDGAR S. NETHERCUT, OF EVANSTON, ILLINOIS.

METHOD OF AND MEANS FOR TYING WEAVERS' KNOTS.

Application filed November 18, 1921, Serial No. 516,010. Renewed February 14, 1927.

The invention relates generally to the textile art, wherein it frequently becomes necessary in spooling and other operations to unite threads, and the aim of the present invention is to provide an improved method of and means for tying weavers' knots.

In the present embodiment of the invention, I have shown a knot-tying mechanism forming part of a tender mechanism which is mounted upon a winder and which serves to unite the ends of the threads of the yarn masses being formed to the ends of the threads of reserve bobbins suitably supported upon the winder. A winder of the type to which my invention is applicable is illustrated and described in my prior Patent No. 1,267,977. In this patent a winder-tending mechanism is mounted for movement around the winder and carries a knot-tying mechanism operable in the travel of the tending mechanism to unite the exhausted and reserve threads at the proper time, the reserve threads being suitably supported for engagement by the tying mechanism in its travel, and the exhausted threads of the cheeses being drawn into operative association with the knot-tying mechanism by an arm which is commonly referred to as a "down-take arm".

While the present embodiment of the invention is a mechanism applicable to winders, it is to be understood that it is not thus limited, for obviously various other embodiments of the invention may be constructed within the scope of the invention.

In forming weavers' knots according to my invention the reserve thread which is held between a pair of thread clamps is engaged and doubled upon itself to form a bight or a loop therein. Thereupon one of the strands of said loop is crossed over the other, and both strands doubled over a relatively stationary element such as a pin. Said loop with its strands crossed constitutes one of the main loops of the knot to be formed. While the strands of this loop are thus doubled over said pin, a temporary loop is formed by seizing the crossed strand of the first loop, carrying it around the pin and drawing a bight thereof through the first loop. Through this temporary loop the exhausted thread is inserted, whereupon the temporary loop, together with the inserted thread, is drawn out of the first loop, which is held relatively stationary by the pin, forming a loop in the exhausted thread which, upon the dissolution of the temporary loop in the crossed strand of the reserve thread, surrounds said strand. The loop thus formed, passing through the first loop and surrounding one strand thereof, thus constitutes the second one of the two coacting loops comprising the weaver's knot.

Figure 12:
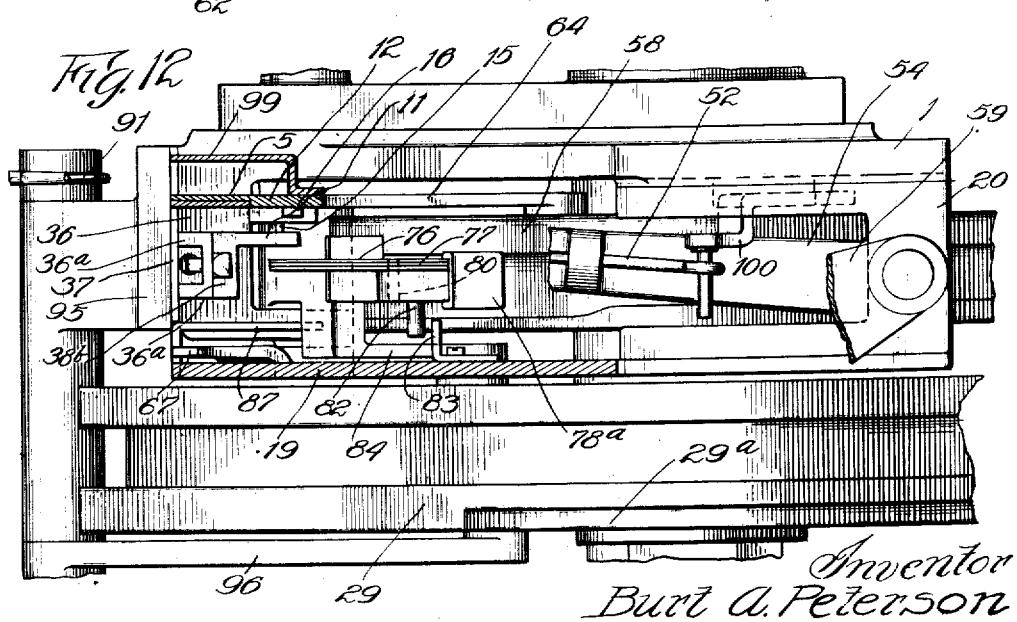
Figure 19:
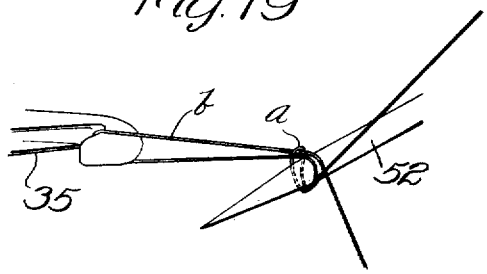
Figure 20:
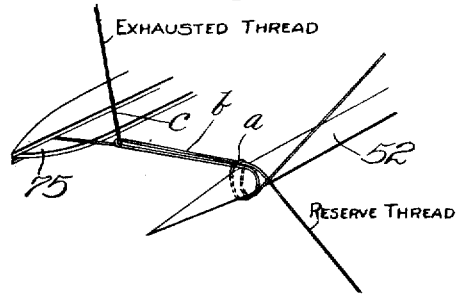
Figure 21:
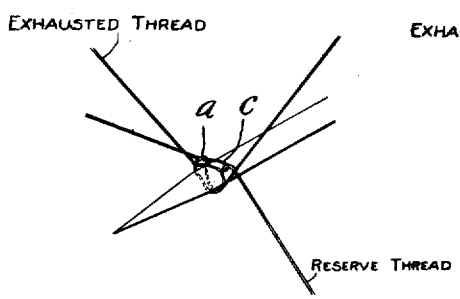
Figure 22:
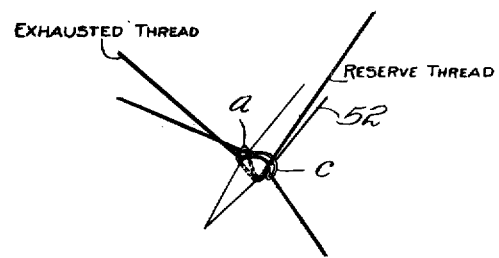
Figure 23:
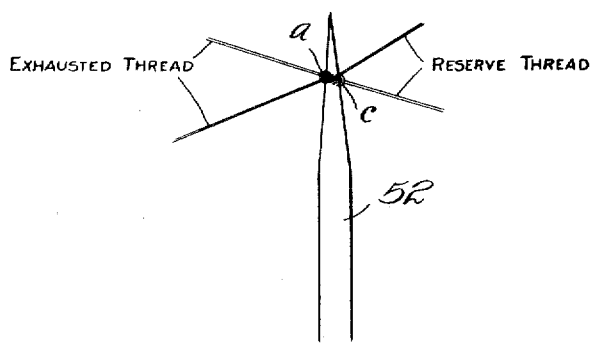

In the accompanying drawings, Figure 1 is a fragmentary front elevation of knot-tying means forming part of a winder-tending mechanism. Fig. 1ª is a fragmentary view somewhat diagrammatic showing the reserve and exhausted threads united, just prior to their release from the operating devices. Fig. 2 is a fragmentary horizontal section showing especially the means for releasing the looped thread from the thread hook. Fig. 3 is a fragmentary end elevation of the knotter. Fig. 4 is a fragmentary underside view of the upper clamp and shear for the reserve thread. Fig. 5 is a fragmentary top plan view of the knotter. Figs. 6 and 7 are fragmentary sectional views taken in the plane of lines 6—6 and 7—7, respectively, of Fig. 5 and showing the manner of mounting certain of the operating arms. Fig. 8 is a fragmentary end elevation of the machine looking toward the left in Fig. 5 and in the direction opposite to that shown in Fig. 3. Fig. 9 is a fragmentary horizontal section showing one of the actuating cams and certain of the operating mechanisms. Fig. 10 is a similar view showing the other one of the actuating cams and certain operating mechanisms. Fig. 11 is a fragmentary perspective view showing the operating devices and the positions of the threads with reference thereto while forming the knot, the relation of the parts being such that the exhausted thread is being drawn through the temporary loop formed in the reserve thread. Fig. 12 is a fragmentary vertical sectional view taken substantially in the plane of line 12 of Fig. 11. Fig. 13 is a fragmentary underside perspective view of the operating devices preliminary to the formation of the main loop of the knot. Figs. 14 to 18 are perspective views showing progressively the operation of forming the first or main loop, and the temporary loop through which the exhausted thread is to be inserted so as to be drawn through the first loop in the reserve thread, the crossed strand of the main loop being shown in Fig. 18, as it is being drawn through the main loop to form the temporary loop. Fig. 19 is a view illustrating the reserve thread after the temporary loop has been drawn through the main loop of the reserve thread. Fig. 20 illustrates the exhausted thread in position to be drawn with the temporary loop through the main loop. Fig. 21 illustrates the bight of the exhausted thread drawn through the main loop. Fig. 22 shows the two loops of the knot drawn together around the pin, just prior to the withdrawal of the pin. Fig. 23 is an underside view of the knot as it is being tightened upon the point of the pin. Fig. 24 illustrates a time chart showing the relative movements of the various operating devices.

Referring first to Figure 1, the knot-tying mechanism is incorporated into the winder-tending mechanism, with the side shown in said figure facing forwardly with reference to the direction of travel of the winder-tending mechanism. In other words, the mechanism shown in Fig. 1 may be assumed to be traveling toward the reader.

The knotter mechanism is mounted upon the under side of a supporting plate 1 which is carried by a bracket 2 upon the framework of the winder-tending mechanism; and the operating devices are located at the forward outer corner of the knotter mechanism so as to engage, in the travel of the winder-tending mechanism, with successive reserve threads held in suitable clamps provided upon the winder, and so as to permit of the swinging of the down-take arm into operative association with the knotter mechanism for the purpose of carrying the exhausted thread into position to be drawn into association with the reserve thread with which it is to be united. The means for gripping the reserve thread comprises an upper clamping and shearing device 3 and a lower clamping device 4. The upper device 3 (Figs. 4, 10, 11 and 13) comprises an arm 5 pivotally mounted at 6 (Fig. 10) upon the under side of the plate 2. At its free end said arm is made of substantial width and carries upon its under side a plate 7, the under surface of the arm being cut away to provide a space between it and the plate adapted to receive the free end of a finger 8 pivoted at 9 to the rear edge of the arm. Rigid with said pivot 9 is a second arm 10 connected at its free end with a rod 11 slidable in a pair of brackets 12 on the under side of the arm 5. The inner end of the rod 11 is connected by means of a contractile spring 13 with a stud 14 carried by the arm, the spring tending to move the arm 8 into clamping position. A pair of lugs 15 and 15ª project rearwardly from the rod 11 into the path of a reciprocatory member 16 movable in a manner later to be described, to actuate the arm 8 to clamp and shear the thread, and to open the clamp so as to release the thread. In order to constitute a shear as well as a clamp, the upper edge of the free end of the arm 8 is sharpened and adapted to coact with the sharpened forward edge 5ª of the arm 5 (see Fig. 14). Preferably the plate 7 is yieldingly mounted upon the under side of the arm 5 as by means of a stud 17 entered loosely through the arm 5 and secured in the plate 7. An expansion spring 18 of substantial strength maintains the parts in operative relation.

The lower clamp 4 is directly below the clamp 3 and in spaced relation with reference to the supporting plate by means of a plate 19 mounted upon a bracket 20 (Fig. 3) secured upon the under side of the supporting plate 1 and at the rear edge thereof. At its forward end the plate 19 carries a plate 21 yieldingly secured in position by means of a stud 22 and an expansion spring 23 (Fig. 13). Said plate 21 is cut away upon its upper surface to provide a space between it and the plate 19 to receive the free end of a clamping arm 24 pivoted at 25 (Figs. 3 and 13) upon the under side of the forward end of the plate 19. Said arm 24 is connected by means of a sleeve 26 with an arm 27 carrying at its free end a roller 28 which engages with a cam wheel 29 having its periphery cut away as at 29ª so that in the rotation thereof the arm 24 is properly actuated. A spring 30 extending between said arm 24 and a stud 31 on the under side of the plate 19 holds the roller 28 against the cam. The coacting edges of the plates 19 and 21 and the arm 24 are slightly rounded so as not to injure the thread while clamping it. The cam wheel 29 may be mounted in any suitable way, as, for example, upon a shaft 32 journalled centrally of the supporting plate 1. Said shaft corresponds to the shaft 223 of Patent No. 1,267,977. As the knotter mechanism moves into engagement with a reserve thread, the actuating means for the clamps 3 and 4 is so timed that the clamp 3 immediately grips the thread, while the lower clamp 4 is inoperative for a short interval so as to initially permit the free movement of the thread with reference thereto. In order to guide the thread while the clamp is thus inoperative, the plate 19 is shaped to provide a throatway 34 adapted to receive and guide the thread.

As the upper clamp 3 operates to grip the reserve thread, it is seized by a sliding hook 35 whose initial position is such that in the travel of the winder-tending mechanism it is moved with the clamps 3 and 4 into engagement with the thread suitably supported upon the winder. This hook immediately moves inwardly to form a bight or loop *a* in the thread (Fig. 14). Referring to Figs. 2, 9 and 12, the hook 35 is slidably mounted upon the under side of the supporting plate 1 at the forward edge thereof, and to this end said plate has a depending flange 36 having a groove 36ª in its forward face, which is closed by means of a face plate 37. The hook comprises two relatively slidable sections 38 and 39. The section 39 is slidable within the section 38, and the latter is mounted upon the rear side of a channel bar 38ª slidable in the groove 36ª, a suitable bracket 38ᵇ being provided at the outer end of the channel for the section 38. The section 38, which may be termed the hook member, has a hook 40 at its forward end adapted to engage with the reserve thread held by the clamps 3 and 4, and inwardly of the hook the member is cut away at its forward side to expose the outer end of the inner section 39. Said section 39 constitutes a tongue which is normally held in engagement with the hook 40 by means of a contractile spring 41 extending between a stud 42 mounted within the channel bar 38ª and a finger 43 which is formed upon the inner end of a rod 44 made rigid with the section 39. The finger extends forwardly through a slot 45 in the inner end of the channel bar 38ª.

At the inner end of the hook member 35 there is provided a roller stud 46 (Fig. 9) which is engaged by the forked end of a lever 47 pivoted at 48 to the under side of the supporting plate 1. This lever carries a roller 49 adapted to operate in a cam groove 50 in the upper surface of the cam wheel 29. The forward end of the lever 47 operates in a slot 36ᵇ formed in the inner end of the flange 36. It will be seen that in the rotation of the cam wheel, the hook will be reciprocated in its groove 36ª, the cam groove 50 being shaped to impart the desired movements to the hook, which will hereinafter more fully appear.

As the arm 47 swings outwardly from its innermost position, both sections of the hook are moved forwardly until the finger 43 at the rear end of the tongue section 39 strikes the outer end wall of a slot 51 formed in the face plate 37 and in which the free end of the finger 43 is adapted to slide. Thereupon the hook member 38 continues to travel against the action of the spring 41 into the position shown in Figs. 9 and 13. As shown in the latter figure, the hook 40 when in its extreme outer position is disposed beneath the reserve thread held by the upper and lower clamps 3 and 4 so that upon the withdrawal of the hook the thread will be drawn inwardly as shown in Fig. 14.

Projecting rearwardly from the guide bracket 38ᵇ for the channel bar 38ª is the member 16 (Figs. 4 and 12) which is adapted to engage in the outward movement of the hook 35 with the lug 15 near the center of the operating rod 11 for the clamping arm 8 of the upper clamp 3. Thus, when the hook is moved into position to grasp a reserve thread, the clamp will be opened to receive such thread and as soon as the hook moves inwardly the spring 13 acts to swing the arm 8 to grip the thread. At the extreme inward movement of the hook, said member 16 engages with the lug 15ª on the rod 11 and positively actuates the arm 8 to shear the upper end portion of the reserve thread.

In the formation of the main loop of the knot, the strands of the reserve thread are positioned with reference to each other and the hook 35 by means of a pin 52 and a finger 53 both mounted to swing up and down between the clamps 3 and 4 and especially with reference to the hook 35. Moreover, the upper clamp 3 is swung upon its pivot 6 in a substantially horizontal plane to further assist in positioning the thread for proper engagement by the thread hook 35.

The pin 52 (Figs. 3 and 10) is tapered at its upper end and is slidably mounted in an arm 54 pivoted upon the inner end of a horizontal stud 55 carried by the bracket 20. Said arm 54 carries a roller 56 upon its inner side which engages in a groove 57 provided in a cam wheel 58 rigid with the shaft 32. Said groove 57 is shaped to impart up and down movements to the pin 52, the initial position of the latter being that shown in Fig. 13 in a plane above the hook 35, and from this initial position the hook moves downwardly as shown in Figs. 14 and 15 during the inward movement of the hook.

As the hook 35 moves outwardly from the position shown in Fig. 14 to that shown in Fig. 15, the finger 53 moves from the initial position adjacent the lower thread clamp 4 to a position slightly below the upper clamp 3 (see Figs. 14 and 15). Said finger 53 is mounted upon an arm 59 (Figs. 3 and 16) pivotally mounted upon a horizontal axis provided by the outer end of the stud 55 which is carried by the bracket 20. The arm 59 has a depending portion 60 carrying a roller 61 adapted to operate in a groove 62 formed in the periphery of the lower cam wheel 29. Said finger is shaped to provide an outwardly opening throatway 63 so located with reference to the clamps 3 and 4 as to provide a guide for the thread extending therebetween (Fig. 13). The upper edge of said finger is inclined forwardly and outwardly as shown at 53ª (Fig. 15) so that in its upward movement it engages the portion of the thread extending between the pin 52 and the upper clamp 3 and forces it forwardly while the portion of the thread extending between the pin 52 and the finger 53 is moved upwardly across the other portion of the thread and into position to be engaged by the thread hook 35 as shown in Figs. 17 to 20.

In order that the upper thread clamp 3 shall assist in thus positioning the reserve thread, swinging movement is imparted thereto upon its vertical axis 6 (Fig. 10). For this purpose the rear end of the arm 5 carrying said clamp has rigid therewith an arm 64 carrying a roller stud 65 adapted to operate in a groove 66 provided in the upper surface of the cam wheel 58. The groove 66 is so shaped that as the hook 35 draws the thread inwardly, as shown in Fig. 14, the clamp 3 swings rearwardly, sliding the strand of the thread extending between the clamp and the hook rearwardly along the pin 52; and when the finger 53 moves upwardly carrying the portion of the thread extending between the pin 52 and the lower clamp 4, the clamp 3 swings forwardly so that the strands of the thread become crossed as shown in Fig. 15 with the lower strand in position to be engaged by the hook 35 as in Fig. 18.

For the purpose of taking up the slack resulting in the formation of the loop by the hook 35 and associated parts, I provide a slack take-up fingers 67 (Figs. 1, 3 and 10) carried by an arm 68 pivotally mounted upon the under side of the supporting plate 1, as at 69. The finger 67 is initially positioned adjacent the upper side of the lower thread clamp 4, and rearward movement is imparted thereto by suitable means such as the cam wheel 58, which is provided with a groove 70 (Fig. 10), in which a roller stud 71 operates, said roller being mounted on an arm 72 rigid with the arm 68 carrying the finger 67. The groove 66 is of such contour that in the movements of the hook 35, the pin 52, the finger 53 and the upper clamp 3, the thread is at all times maintained substantially taut. Thus as the hook 35 moves outwardly the finger 67 moves rearwardly and vice versa. Moreover, the finger acts to tension the threads in the final formation of the knot in a manner which will hereinafter be described.

When the hook 35 initially grasps the reserve thread extending between the upper and lower clamps 3 and 4, with the pin 52 and finger 53 occupying the positions shown in Fig. 15, the main loop $a$ is formed, and through this loop, in the succeeding operation of the hook, is drawn the lower or crossed strand of the thread extending between the finger 53 and the pin 52 to form a temporary loop $b$ (see Figs. 19 and 20).

In thus forming the loops $a$ and $b$ the sectional construction of the hook 35 is brought into use. Referring particularly to Figs. 15 to 18, it will be seen that the forward edge of the hook section 38 immediately inwardly of the hook portion 40 is cut away at each side and that the outer end of the tongue 39 is beveled upon its rear side so that when the hook section 39 engages with the hooked end 40 an opening 73 is formed. Through this opening the loop $a$ extends when the parts are in the position shown in Figs. 14 and 15, and as the hook 35 moves outwardly to grasp the lower crossed strand of the thread to form the loop $b$, the tongue 39 is stopped by the finger 43 engaging the outer end wall of the slot 51 (Fig. 10) and the loop $a$ is slid inwardly over the tongue 39 to an increased diameter, the walls of the section 38 being curved as at 74 for this purpose (Fig. 17). Referring now to Fig. 20; the hook section 38 having moved outwardly to grasp the crossed strand of the thread, the succeeding inward movement of the section 38 into engagement with the tongue 39 closes the opening 73 so that in the continued inward movement of the hook the loop $a$ is guided by the tongue so that it slips over the hooked end 40 free of the hook, and the crossed strand in the opening 73 is drawn through the loop $a$ to form the loop $b$ as above described, the latter being retained by the hooked end 40.

The next operation (Fig. 11) is that of drawing the exhausted thread (which has been moved into operative association with the knotter mechanism by a down-take arm shown at A in broken lines in Fig. 1) through the temporary loop $b$. (The arm A corresponds to the arm 316 of Patent No. 1,267,977.) This is accomplished by means of a clamping and shearing device 75 (Figs. 2 and 9) consisting of a pair of stationary fingers 76 and a movable finger 77. The fingers 76 are mounted at the free end of an arm 78 pivoted on the vertical axis provided by the stud 69 and above the actuating arm 72 for the slack-take-up arm 68; and the finger 77 is pivotally mounted as at 80 upon the free end of said arm 78 and has a rear bent portion 81 (Fig. 9) carrying a stud 82 adapted to engage with a stop 83 which is mounted upon the upper surface of the plate 19. Said arm 78 carries between its ends a bracket 84 in which is mounted a roller stud 85 adapted to travel in a groove 86 provided in the upper surface of the cam wheel 29. In the rearward swinging movements of the arm 78, the finger 77 is arranged to be operated by the stud 82 engaging with the stop 83, the latter serving to move the finger into open position with reference to the fingers 76. When said arm moves forwardly, the stud 82 engages with a stop member 87 also carried by the plate 19 (Figs. 2 and 11). In this latter movement of the arm 78 it will be seen that the finger 77 moves with reference to the fingers 76 (Fig. 2) to clamp the exhausted thread and cut off the lower end thereof. Preferably the fingers 76 and 77 are removably mounted upon the free end of the arm 78. To this end a band 78ᵃ is mounted upon the arm, which is adapted to receive the fingers between it and the arm, the fingers being held in place by the pivot pin 80.

The contour of the groove 86 in the cam wheel 29 is such that the arm 78 is swung to carry the clamping and shearing device 75 forwardly through the loop *b* (Fig. 11), at the proper time, into engagement with the exhausted thread which has been positioned forwardly of said loop by the down-take arm A, and thence rearwardly drawing the exhausted thread with it to form a loop or bight *c* (Fig. 20). As the clamping and shearing device moves forwardly to its extreme forward position, the outer end of the tongue 39 of the hook 35 is moved forwardly by a finger 88 carried by the arm 78, so as to release the inner end of the loop *b* from the hooked end 40 while the loop is placed under tension by means of a finger 89 also carried by the arm 78 and preferably made rigid with the finger 88. The latter finger in its forward movement projects through a slot 90 provided in the forward end of the section 38 of the thread hook, and the finger 89 is positioned so as to just clear the outer end of the hook section 38 (see Fig. 2). When the loop *b* has thus been released from the hook 40 the clamping and shearing device 75 moves rearwardly, carrying with it the end of the exhausted thread clamped therein and forming the loop *c*. Meanwhile, the threads are placed under tension through the operation of the lower slack-take-up finger 67 (Fig. 11) and an upper slack-take-up finger 91 (Fig. 11) whereby to draw the loop *b* together with the loop *c* formed in the exhausted thread, through the loop *a* as shown in Figs. 21 and 22.

Referring to Figs. 11, 20 and 21, it will be observed that as tension is placed upon the threads in the formation of the knot, the main loop *a* is held relatively stationary by the pin while the temporary loop *b* with the bight or loop *c* of the exhausted thread is drawn through the main loop *a*. The presence of the pin 52, therefore, in the knot as it is being formed, insures the proper relative movement between the threads to effect the final interengagement between the loops *a* and *c* of the reserve and exhausted threads which produces the weaver's knot. The temporary loop *b* in its return passage through or out of the main loop *a* obviously becomes straightened, (its function having been accomplished in drawing the loop *c* through the loop *a*) leaving the strand of the main loop from which it was formed, engaged by the loop *c*.

The upper slack-take-up finger 91 (Figs. 1, 10 and 11) is formed upon the free end of a rod 92 fixed at one end upon a collar 93 which is mounted upon a shaft 94 (Fig. 3). The latter is carried in a bracket 95 supported at the forward end of the supporting plate 1. At the opposite or lower end of said shaft 94 is fixed an arm 96 (Fig. 9) carrying a roller stud 97 arranged to operate in a groove 98 provided in the under surface of the cam wheel 29 and shaped to impart the proper movements to the fingers. Thus immediately after the exhausted thread is carried into position the finger 91 moves rearwardly in order to provide slack to permit of the downward movement of the clamping and shearing device 75 carrying the exhausted thread with it. In thus forming the slack the finger moves rearwardly between the arm 5 of the upper clamp and a plate 99 mounted upon the upper side of said arm 5 in spaced relation with reference thereto (see Figs. 11 and 12).

After the exhausted thread had been drawn into association with the reserve thread to form the knot, continued tension placed upon the threads draws the loops *a* and *c* into interengagement around the pin 52 to tighten the knot, and the pin is gradually withdrawn therefrom. During this movement of the pin, the tightening of the knot continues until finally at the point of the pin, the knot is completed. For the purpose of thus withdrawing the pin 52, I provide means shown particularly in Figs. 3, 10 and 12. This means consists of a lever 100 to the free or outer end of which is pivotally secured the rear end of the pin 52, as at 101, and which is pivoted at its inner end upon a vertical stud 102 carried by the supporting plate 1. A roller stud 103 carried by said lever 100 is adapted to engage in a cam groove 104 provided in the upper face of the cam wheel 58. Said groove 104 is shaped so that as the clamping and shearing device 75 approaches its rearmost position the pin 52 is moved rearwardly and withdrawn from the knot, tension being placed upon the threads of the rearward movement of both the upper and lower slack-take-up fingers 67 and 91 to draw the loops *a* and *c* together and tighten the knot. In such rearward movement of the device 75 the pin 82 at the rear end of the finger 77 strikes the stop 83 and thus swings the finger 77 into open position with reference to the fingers 76.

In the continued operation of the mechanism, the tension placed upon the threads by said slack-take-up fingers becomes sufficient to withdraw the end of the exhausted thread from the clamping and shearing device 75, and finally the slack-take-up members move forwardly and the threads held by the upper and lower clamps 3 and 4 are released, permitting the winding operation to be resumed as the winder-tending mechanism continues advancing to the next winding unit.

For convenience in setting the mechanism, the cam wheel 29 may, if desired, be provided on its outer periphery with a scale graduated to 360 degrees, and a pointer 105 (Fig. 8) may be mounted upon the inner edge of the supporting plate 1 and arranged in operative association with said scale.

For the purpose of showing diagrammatically the relative movements of the various operating devices, I have illustrated in Fig. 24 a chart upon which is shown the movements of each device with reference to the others and the time of operation of the several devices with reference to the scale on the cam wheel 29.

The operation of the machine may be briefly summarized as follows:

The knotter mechanism having encountered a reserve thread vertically disposed upon the winder, said thread is gripped by the upper shearing and clamping device 3. Simultaneously, the thread hook 35 moves rearwardly from a position in substantial alinement with the clamps 3 and 4, drawing with it the reserve thread to form the loop $a$ (Fig. 14). At the completion of this loop, the lower clamp 4 operates to grip the thread passing through the throatway 34 (Fig. 14). As the hook 35 approaches its extreme inward position, the projection 16 thereon positively actuates the arm 8 of the upper clamp to cut off the upper end of the reserve thread. The pin 52 is now moved downwardly and the positioning finger 53 moved upwardly into the positions shown in Fig. 15, and in this operation the portion of the thread extending between the pin 52 and the finger 53 is crossed over the portion of the thread extending between the pin 52 and the upper clamp 3 and into position to be engaged by the hook 35 upon its second outward movement, as shown in Figs. 17 and 18. As the hook moved outwardly to engage said crossed strand, the loop $a$ rode up on the cam edges 74 of the section 38 of the hook and over the tongue 39, as shown in Fig. 17, so that as the hook now moves rearwardly with the crossed strand engaging with the hooked end 40, beneath the tongue 39, said strand (doubled upon itself) passes through the loop $a$ as the latter slips off from the hook. As the crossed strand is carried inwardly by the hook, the loop $b$ is formed. The exhausted thread having been carried into position forwardly of said loop $b$ by the down-take arm A, the clamping and shearing device 75 moves upwardly through the loop $b$ and seizes the exhausted thread which is held by suitable means, such as suction tubes (not shown), also in vertical position substantially parallel to the reserve thread and in this movement the movable finger 77 of the device 75 is actuated by its engagement with the stop 87 to clamp the exhausted thread and shear the lower end thereof. Said device 75 carries with it in this movement the finger 88 (Fig. 2), and this finger engages the tongue 39 of the hook and moves it forwardly while the finger 89 engages with the loop $b$ forwardly of the hook 40 and disengages the loop from the hook. The device 75 then moves rearwardly, drawing the exhausted thread through the temporary loop $b$ in the reserve thread, and as the operation continues, the slack-take-up fingers, which operate to maintain at all times sufficient tension upon the threads, move to draw the temporary loop $b$ of the reserve thread with the loop $c$ of the exhausted thread through the main loop $a$ (Figs. 21 and 22). In this operation, the loop $a$ of the reserve thread is held stationary by the pin 52 and in such position that the proper passage of the loop $b$ (with the loop $c$ engaging therein) through the loop $a$, is insured. After the loop $b$ emerges from the loop $a$ it becomes dissolved and the loops $a$ and $c$ interengage to form the weaver's knot. The pin 52 is now gradually withdrawn from the knot while the loops thereof are drawn together in the continued operation of the slack-take-up fingers, to tighten the knot which is completed at the very point of the pin. Finally, the exhausted thread is pulled free from the device 75, the upper clamp 3 operated to release the reserve thread end, and the lower clamp 4 operated to release the strand leading to the bobbin which is to be unwound in the continued operation of the winder. As the clamps 3 and 4 open, the hook 35 moves outwardly into substantial alinement with the clamps so as to engage the next reserve thread, the slack-take-up fingers move into their forward or initial positions, and the clamping and shearing device opens for the reception of the exhausted thread positioned by the down-take arm A.

It is to be understood that while the invention has been herein illustrated and described with considerable particularity, it is contemplated that various changes may be made in construction and arrangement without departing from the spirit and scope of the invention as expressed in the following claims.

In a copending application Serial No. 665,809, filed October 1, 1923, I have illustrated and described a specifically different construction and mode of operation, which illustrates the invention in its preferred form. Such claims, therefore, as are generic to the structures of both applications are contained in the aforesaid application Serial No. 665,809.

I claim as my invention:

1. A knot-tying mechanism comprising, in combination, means for holding and guiding a thread, a reciprocatory device operable into engagement with said thread to form a loop therein, a member movable from a position at one side of the plane of movement of said device into engagement with said loop to carry the strands thereof to a position at the opposite side of the plane of movement of said device, a second member movable into engagement with one of the strands of said loop to position it in crossed relation with reference to the other strand, said device being operable to engage said crossed strand and draw it through said loop to form a second loop, means for inserting a second thread through said second loop, and means for drawing the second loop together with said inserted thread through the first loop.

2. A knot-tying mechanism comprising, in combination, means for holding and guiding a thread, a reciprocatory hook operable into engagement with said thread to form a loop therein, a member movable from a position at one side of said hook into engagement with said loop to carry the strands thereof to a position at the opposite side of said hook, a second member movable into engagement with one of the strands of said loop to position it in crossed relation with reference to the other strand, said hook being operable to engage said crossed strand and draw it through said loop to form a second loop, means for inserting a second thread through said second loop, means for releasing the second loop from the hook, and means for drawing the released loop together with said inserted thread through the first loop.

3. A knotter comprising, in combination, a pair of thread clamping and guiding devices mounted in spaced relation, means for operating upon a thread held by said devices including a hook operable to grasp said thread and form a main loop therein, a pair of members movable with reference to said hook whereby to cross one strand of the main loop with reference to the other, said hook being operable to grasp the crossed strand to form a temporary loop, means for inserting a second thread through said temporary loop, and means for drawing said temporary loop together with the inserted thread through the main loop.

4. A knotter comprising, in combination, a pair of thread clamping and guiding devices mounted in spaced relation, means for operating upon a thread held by said devices including a hook operable to grasp said thread and form a loop therein, a pair of members movable with reference to said hook whereby to cross one strand of the loop with reference to the other, said hook being operable to grasp the crossed strand to draw it through the first loop to form a temporary loop, means for inserting a second thread through said temporary loop, and means for drawing said temporary loop together with the inserted thread through the first loop, one of said thread clamping devices being adapted to shear the end of the thread held thereby.

5. A knotter comprising, in combination, means for holding and guiding a thread, a hook operable to grasp said thread and form a loop therein, means for positioning the strands of the loop so as to cross one strand beneath the other, said hook being operable to engage the crossed strand and draw it through said loop to form a temporary loop, said positioning means including a member around which the first loop is held, means for inserting a second thread through the temporary loop while the latter is held by said hook, means for releasing the temporary loop from said hook, and means for placing tension upon the threads whereby to draw the temporary loop together with the inserted thread through the main loop.

6. A knotter comprising, in combination, means for holding and guiding a thread, means for forming in said thread a main loop and a second loop formed in one of the strands of the main loop, said means including a sliding hook formed in two relatively slidable sections, the outer one of which is provided with a hooked end adapted to engage said thread to form the main loop therein, means for positioning the strands of said thread with reference to said loop whereby to cross one strand beneath the other, said hook being operable to engage the crossed strand while said loop slides over the inner section of the hook and to draw the crossed strand through the last mentioned loop to form said second loop, means for inserting a second thread through the second loop, means for releasing the second loop from said hook, and means for drawing the second loop with said inserted thread through the main loop whereby to form a weaver's knot.

7. A knotter comprising, in combination, means for holding and guiding a thread, means adapted to operate on said thread to form a main loop with one strand crossed over the other and a second loop therein formed in the crossed-over strand, means for inserting a second thread through said second loop including a pivoted arm, a stationary finger on said arm, and a pivoted finger operable in the movements of the arm and adapted to coact with said stationary finger to clamp the thread, and means for drawing the second loop together with the inserted thread through the main loop to form a knot.

8. A knotter comprising, in combination, means for holding and guiding a thread, means operable to form in said thread a main loop and a second loop, said means including a hook comprising an inner section and an outer section, the outer section having a hook adapted to engage said thread to form the main loop, means for positioning the strands of the main loop, said hook being operable to engage one of said strands to draw it through the main loop to form the second loop, said inner section of the hook being adapted to hold the second loop while said strand is being drawn therethrough, means for inserting a second thread through the second loop, said means having operatively associated therewith means for engaging said hook whereby to release the second loop therefrom, and means for tensioning the threads to draw the second loop together with the inserted thread through the main loop to form the knot.

9. In a knotter, the combination of means for operating upon a thread comprising a hook having an inner section and an outer section, the outer section having a hooked end adapted to engage with a thread to form a loop therein, the inner section being slidable with reference to the outer section and having a resilient connection therewith, said inner section being adapted to coact with said hooked end of the outer section to form an aperture for retaining the thread grasped by the outer section, means for limiting the movement of the inner section as the outer section moves forwardly to grasp the thread, means for positioning the strands of the loop for engagement by said hook upon a second movement thereof, said outer section of the hook being adapted to cause said loop to slide over the inner section in such second forward movement whereby upon the rearward movement of the hook the strand engaged therein may be drawn through said loop.

10. In a knotter, the combination of means for operating upon a thread including a reciprocable but non-rotatable hook and a thread-positioning member movable transversely with reference to each other, said hook being adapted to engage with a thread to form a loop therein, means for actuating said member to carry the strands of the loop out of alinement with the hook, means for crossing one strand of the loop beneath the other substantially in alinement with said hook, said hook being operable to engage said crossed strand and having means for guiding the loop initially engaged to an increased size whereby the crossed strand may be drawn through said loop to form a second loop.

11. A knotter comprising, in combination, means operable upon a thread to form a main loop and a second loop formed in one strand of the main loop and drawn through the first loop, said means including a reciprocatory hook adapted to grasp the thread to form the first or main loop, a member operable into engagement with the strands of said loop, and means for positioning said strands upon said member and crossing them with reference to each other so that one of them may be engaged by the reciprocatory hook and drawn through said first loop to form the second loop.

12. In a knotter, the combination of a reciprocatory hook, a pair of thread-engaging and positioning members operable in planes extending transversely of the plane of movement of said hook, said hook being operable to seize a thread and form a loop therein, and means operating to position one strand of said loop in crossed relation with reference to the other strand, said hook being operable into engagement with the crossed strand to seize it and draw it through said loop.

13. In a knotter, the combination of a reciprocatory hook, a pair of members movable in planes transversely of the plane of movement of said hook and operable to position the strands of the loop formed by said hook in crossed relation with one of the strands substantially in alinement with the hook and the other strand held out of the plane of movement of the hook whereby the hook is adapted to engage the first mentioned strand and draw it through the first mentioned loop.

14. In a knotter, the combination of a reciprocatory device and a pair of thread positioning members operable in planes extending transversely of the plane of movement of means for actuating said device, to cause it to engage a thread and form a loop therein, and means for actuating said members with reference to the device and with reference to each other whereby to position one strand of the loop in crossed relation with reference to the other, said device comprising a hook member operable into engagement with said crossed strand, and a tongue over which said loop is movable as the hook moves into engagement with said crossed strand, said tongue being operable as the hook moves in the opposite direction to guide said loop over the hook while the crossed strand is drawn through the loop.

15. In a knotter, the combination of a reciprocatory device having a hook adapted to engage with a thread to form a loop therein, means for positioning the strands of the loop into position so that one of them may be engaged by said hook and drawn around the other strand through said loop to form a second loop, said device having means for releasing said first loop from the hook before the hook operates to form the second loop.

16. In a knotter, the combination of a reciprocatory device operable into engagement with a thread to form a loop therein, means for positioning the strands of the loop into position so that one of them may be engaged by said device and drawn around the other strand through said loop to form a second strand loop, means for inserting a second thread loop through the second loop, said device having means for releasing said loop therefrom as said strand is being drawn through the loop, and means for tensioning the threads to cause the second loop with its inserted thread to be drawn through the first loop.

17. In a knotter, the combination of means operable to form a main loop and a second loop in a thread, the second loop being formed in one strand of the main loop, said means including a reciprocatory device having a hook adapted to engage with the thread to form a loop, and a tongue operable to release the loop from the hook.

18. In a knotter, the combination of means operable upon a thread to form a main loop with one strand crossing over the other and a second loop formed in the crossed strand of the main loop and passing therethrough, said means including a reciprocatory device having a hook adapted to engage with the thread to form said loops, said hook having a tongue operable to release one of said loops while the hook is forming the other loop, means for inserting a second thread through said other loop, means for releasing the last-mentioned loop from said hook, and means for drawing the last mentioned loop together with its inserted thread through the loop first released from said hook.

19. In a knotter, the combination of thread clamping and shearing means, and knot-forming means including a reciprocatory device, said clamping and shearing means including a pair of relatively movable members, and a spring-controlled actuating rod operable in the movement of said reciprocatory device to actuate said members.

20. In a knotter, the combination of knot-forming means including a hook adapted to form a loop in a thread, and a device for inserting a second thread through said loop including a pair of relatively movable fingers, means for actuating said device, and means operable in the movement of said device to actuate one of said fingers.

21. In a knotter, the combination of knot-forming means including a reciprocatory device adapted to engage with a thread to form a loop therein, a thread positioning member, said reciprocatory device being operable to form with said member a loop held by said device and another loop surrounding said member, means operable to insert a second thread through the loop held by said device, means for releasing the loop held by said device, means for drawing the last mentioned loop together with said inserted thread through the loop around said member to form the knot, and means operable to withdraw said member from the knot.

22. In a knotter, the combination of knot-forming means including a reciprocatory device, a pair of members operable in planes transversely of the plane of movement of said device, said device being adapted to engage with a thread to form a loop therein and said members being movable in opposite directions whereby to carry one strand of the loop across the other strand and in position to be engaged by the device, one of said members in its movement being adapted to engage both strands of the loop and being shaped to maintain them in spaced relation whereby the crossed strand may be engaged by said hook and drawn through the loop held thereby.

23. In a knotter, the combination of a reciprocatory loop-forming device, means for clamping a thread including an arm swingable toward and away from the plane of movement of said device, and a pair of members movable across the plane of movement of said device and operable to position the threads with reference thereto.

24. A knotter comprising, in combination, means for holding and guiding a thread including a clamp mounted for swinging movement, knot-forming means including a reciprocatory device and a pair of thread-positioning members movable in opposite directions across the plane of movement of said reciprocatory device, and means for actuating said swingable clamp, said reciprocatory device and said members whereby the knot-forming means operates to form a loop engaging one of said members and a second loop passing through the first loop and held by said device.

25. In a knotter, the combination with means for positioning a thread, a reciprocatory device operable on the thread to form therein a main loop and a second loop disposed within the main loop, said device comprising a hook member adapted to grasp the strands of the thread, and a tongue member adapted in the movements of the device to coact with said hook member in the formation of said loops.

26. In a knotter, means operable upon a thread to form therein a main loop and a second loop disposed within the main loop, said means including a reciprocatory device comprising a hook member, a tongue mounted for relative movement with reference to the hook member, and means operable in the movement of said device to effect relative movement between said tongue and said hook member.

27. In a knotter, means operable upon a thread to form therein a main loop and a second loop disposed within the main loop, said means including a reciprocatory device comprising a hook member, a tongue mounted for relative movement with reference to the hook member, and means operable in the movements of said device to limit the movement of said tongue in one direction while the hook member continues to travel.

28. In a knotter, means operable upon a thread to form therein a main loop and a second loop disposed within the main loop, said means including a reciprocatory device including a slide bar, a hook member slidably mounted upon said bar, a tongue slidably mounted within said hook member and having a resilient connection with said slide bar, and means for limiting the movement of said tongue in one direction as the hook member continues to travel.

29. In a knotter, means operable upon a thread to form therein a main loop and a second loop disposed within the main loop, said means including a reciprocatory device comprising a slide bar, a hook member mounted upon said bar, a second member mounted within the hook member and having a resilient connection with said slide bar, said hook member having a hook on its free end with which said tongue is adapted to coact in the formation of the knot.

30. In a knotter, means operable upon a thread to form therein a main loop and a second loop disposed within the main loop, said means including a reciprocatory device comprising a member of U-shaped cross section having a hook at its free end, and a member mounted within said bar having its free end beveled so as to coact with said hook to form therewith an aperture for receiving a thread and adapted to guide a loop surrounding the free end of said first mentioned member over the hook while forming the second loop.

31. In a knotter, a reciprocatory device for clamping and shearing a thread comprising a pair of stationary fingers constituting stationary blades, a movable finger constituting a movable blade adapted to coact with said stationary blades to clamp and shear a thread, said movable finger having at one end an actuating stud, and a stop with which said stud is adapted to engage in the reciprocation of said device to actuate said movable blade.

32. In a knotter, a reciprocatory device for clamping and shearing a thread comprising a pivoted arm having two blades mounted at its free end one swingable relative to the other, one of said blades having a stud, means adapted for engagement by said stud whereby in the reciprocation of said device the blade is opened and closed, and means for swinging said arm.

33. In a knotter, the combination of a device for forming in a thread a main loop and a second loop disposed within the main loop said device including a hook having a stationary section and a movable section coacting to engage and hold one of said loops; means for associating a second thread with the first thread to form a weaver's knot including a thread clamping and shearing device operable into engagement with a second thread to draw it through the loop held by said hook; and means operable to release said loop as said clamping and shearing device grips said second thread.

34. In a knotter, the combination with means for forming in a thread a main loop and a second loop disposed within the main loop, including a hook comprising a stationary section and a movable section coacting to engage and hold one of said loops; of means operable through said loop to engage a second thread and draw it therethrough, and means for releasing the loop held by said hook as said second thread is gripped by said means.

35. In a knotter, the combination with means for forming in a thread a main loop and a second loop disposed within the main loop, said means including a hook adapted to engage and hold said second loop; of means operable through said second loop to grip a second thread and draw it through said second loop, and means operable to release said second loop from said hook as the second thread is drawn through said second loop by said thread gripping means.

36. In a knotter, the combination with means for forming in a thread a main loop and a second loop disposed within the main loop, said means including a hook adapted to engage and hold said second loop; of a device operable through said second loop while held by said hook to engage a second thread and draw it through said second loop, and a finger operable into engagement with said second loop to lift it free of engagement with said hook as said second thread is gripped by said device.

37. In a knotter, the combination with means for forming in a thread a main loop and a second loop disposed within the main loop, said means including a reciprocatory device having one section with a hook thereon and another section adapted to coact with said hook to hold the second loop of said thread; of a device operable through said second loop while held by said hook to engage a second loop and draw it through the second loop, and a pair of fingers adapted to engage respectively said loop while held by said hook section and the other one of said sections whereby to release said loop from the hook.

38. In a knotter, the combination of a reciprocatory device, of thread positioning means including a pair of clamps mounted in spaced relation, one of said clamps being swingable in a plane substantially parallel with the other one of said clamps, and a pair of thread engaging members operable transversely between said clamps and transversely of the plane of movement of said reciprocatory device.

39. In a knotter, the combination with a reciprocatory thread engaging device, of means for holding a thread in position for engagement by said device in its reciprocation, said means including a pair of thread clamps spaced apart and a finger operable between said clamps transversely of the plane of movement of said device, said finger having a throatway for receiving and guiding one strand of the thread and a cam surface for guiding another strand of the thread.

40. A knotter comprising, in combination, means for clamping a thread, means to operate on said thread to form a main loop and a second loop drawn through the main loop, means for inserting a second thread through said second loop including a reciprocating arm, a pair of relatively movable fingers on said arm operable in the movements of the arm to engage and clamp the second thread, and means for drawing the second loop, together with the inserted thread, through the main loop to form a knot.

41. A knotter comprising, in combination, means operable upon a thread to form a main loop and a second loop formed in one strand of the main loop and drawn through the first loop, said means including a reciprocatory but nonrotatable hook adapted to grasp the thread to form the first or main loop, a member operable into engagement with the strands of said loop, and means for positioning said strands upon said member relative to each other so that one of the strands may be engaged by the reciprocatory hook and drawn through said first loop to form the second loop.

42. A knotter having, in combination, means operable upon a thread to form therein a main loop and a second loop disposed within the main loop, said means including a reciprocatory but nonrotary member having a hooked end and means operable as the hook member moves in one direction to disengage said main loop from said hooked end.

43. In a weaver's knotter, the combination of a thread anchoring element, a reciprocatory but nonrotatable hook member adapted to engage with a thread to form a loop therein with both strands of the loop engaging said anchoring element, means for positioning one of the strands of said loop in crossed relation to the other strand on the side of the anchoring element opposite said hook member, the hook member being movable into engagement with the crossed-over strand and thence movable to form a second loop in the crossed-over strand, said hook member being operable as it moves to engage the crossed-over strand to disengage therefrom the first mentioned loop.

44. In a weaver's knotter, the combination of a thread anchoring element, a reciprocatory but nonrotatable member having a hooked end, said member being movable to cause its hooked end to engage with a thread to form a loop therein with both strands engaging said anchoring element, means operating to position said strands in crossed relation, whereby one of the strands may be engaged by said hooked end and in the movement of the hooked member form a second loop in the thread, and means engaging with said hooked member and operable to disengage the first loop therefrom as it moves into engagement with said strand to form the second loop, whereby the second loop may be drawn through the first loop.

45. In a weaver's knotter, the combination of means operable upon a thread to form a main loop therein and a second loop drawn through the first loop, said means including a reciprocatory but nonrotatable member having a hooked end, means operable after formation of the first loop to position the strands thereof so that one strand crosses the other, said member being operable to move its hooked end into engagement with the crossed-over strand, and means coacting with said hooked end, whereby in the formation of the second loop it is drawn through the first loop.

46. A weaver's knotter comprising, in combination, an anchoring pin having one end gradually tapering to a point, means including a reciprocatory but nonrotatable member operating to form in two threads a pair of interengaging loops disposed upon opposite sides of said pin, and means acting to effect the withdrawal of said loops from the pin while simultaneously drawing the loops in opposite directions to tighten the knot.

47. A weaver's knotter having, in combination, an anchoring element and means including a reciprocatory but nonrotatable member operable to engage a thread to form a loop therein with one strand crossed-over the other on one side of said element, said means being further adapted to draw a bight of the cross-over strand around said element to form an anchoring loop containing said element and thence through the first loop.

48. A knotter having, in combination, an anchoring element and means operable to engage one strand of a thread loop engaging one side of said element and operating to draw a bight of the engaged strand around said element and through said loop, thereby forming an anchoring loop containing said element, said means including a reciprocatory but nonrotatable member having a hooked end for engaging the thread, and means coacting with said hooked end in the movement of the member to disengage said bight from said hooked end.

49. In a knotter, the combination with a projecting member, of means for operating upon a thread to form a loop therein with both strands thereof engaging with said member and one strand crossed over the other, the first mentioned means including a reciprocatory but nonrotatable member having a hooked portion adapted to engage with said crossed strand to draw it around said member and through the first loop, and means operable to insert a second thread through the second loop and draw it through the first loop to form a weaver's knot.

50. In a knotter, the combination with a projecting element, of means operating upon a thread to form a loop therein having crossed strands and a second loop formed in one of said strands and drawn around said element through the first loop, said means including a reciprocatory hooked member, and means coacting with said element after the formation of the first loop to position the strands thereof in crossed relation.

51. The method of uniting two threads which consists in forming a loop in one thread with the strands of the loop passing partially around an anchoring element, then moving the strands of said loop relative to each other to cross one of them over the other, drawing the crossed strand of the said loop to form a second loop, inserting the other one of said threads through the first loop, drawing the second loop of the inserted strand through the first loop and around said anchoring element, and placing tension upon the threads to draw said loops together while withdrawing them from the anchoring element.

52. The method of forming a weaver's knot which consists in first forming in one thread a main loop about an anchoring element, then crossing one of the strands of said loop over the other, then drawing a bight of the crossed-over strand through the main loop, inserting the second thread through said bight, and finally withdrawing said bight with the inserted strand through the main loop to form about the anchoring element a second loop passing through the main loop and disposed oppositely relative thereto.

In testimony whereof, I have hereunto set my hand.

BURT A. PETERSON.

CERTIFICATE OF CORRECTION.

Patent No. 1,664,571.  Granted April 3, 1928, to

BURT A. PETERSON.

It is hereby certified that error appears in the printed specification of the above numbered patent requiring correction as follows: Page 2, line 80, before the word "directly" insert the word "carried"; page 4, line 29, for the word "fingers" read "finger; page 8, line 101, claim 14, before the word "means" insert the words "said device"; and that the said Letters Patent should be read with these corrections therein that the same may conform to the record of the case in the Patent Office.

Signed and sealed this 8th day of May, A. D. 1928.

(Seal)

M. J. Moore,
Acting Commissioner of Patents.

means coacting with said hooked end in the movement of the member to disengage said bight from said hooked end.

49. In a knotter, the combination with a projecting member, of means for operating upon a thread to form a loop therein with both strands thereof engaging with said member and one strand crossed over the other, the first mentioned means including a reciprocatory but nonrotatable member having a hooked portion adapted to engage with said crossed strand to draw it around said member and through the first loop, and means operable to insert a second thread through the second loop and d.aw it through the first loop to form a weaver's knot.

50. In a knotter, the combination with a projecting element, of means operating upon a thread to form a loop therein having crossed strands and a second loop formed in one of said strands and drawn around said element through the first loop, said means including a reciprocatory hooked member, and means coacting with said element after the formation of the first loop to position the strands thereof in crossed relation.

51. The method of uniting two threads which consists in forming a loop in one thread with the strands of the loop passing partially around an anchoring element, then moving the strands of said loop relative to each other to cross one of them over the other, drawing the crossed strand of the said loop to form a second loop, inserting the other one of said threads through the first loop, drawing the second loop of the inserted strand through the first loop and around said anchoring element, and placing tension upon the threads to draw said loops together while withdrawing them from the anchoring element.

52. The method of forming a weaver's knot which consists in first forming in one thread a main loop about an anchoring element, then crossing one of the strands of said loop over the other, then drawing a bight of the crossed-over strand through the main loop, inserting the second thread through said bight, and finally withdrawing said bight with the inserted strand through the main loop to form about the anchoring element a second loop passing through the main loop and disposed oppositely relative thereto.

In testimony whereof, I have hereunto set my hand.

BURT A. PETERSON.

CERTIFICATE OF CORRECTION.

Patent No. 1,664,571.  Granted April 3, 1928, to

BURT A. PETERSON.

It is hereby certified that error appears in the printed specification of the above numbered patent requiring correction as follows: Page 2, line 80, before the word "directly" insert the word "carried"; page 4, line 29, for the word "fingers" read "finger; page 8, line 101, claim 14, before the word "means" insert the words "said device"; and that the said Letters Patent should be read with these corrections therein that the same may conform to the record of the case in the Patent Office.

Signed and sealed this 8th day of May, A. D. 1928.

(Seal)

M. J. Moore,
Acting Commissioner of Patents.